Z. BUTT.
Dumping-Wagon.
No 52,963
Patented Mar. 6, 1866.
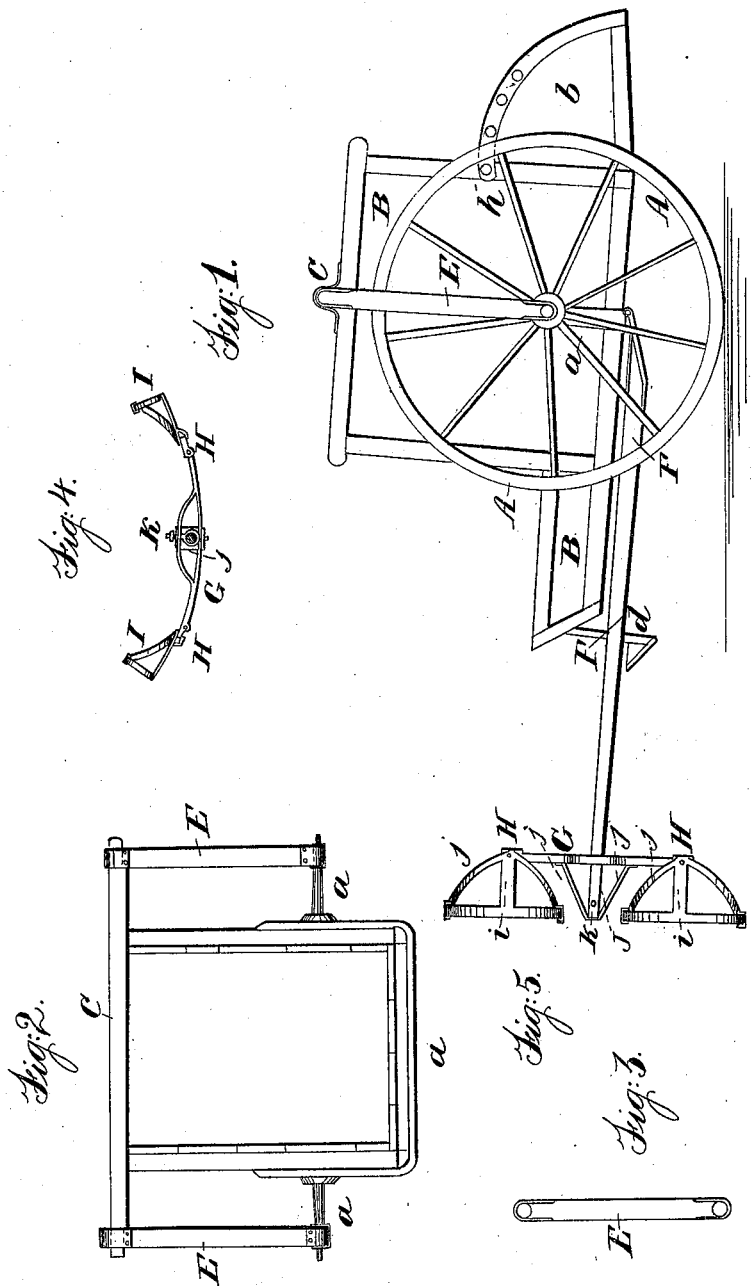

UNITED STATES PATENT OFFICE.

ZE BUTT, OF OCALA, FLORIDA.

IMPROVEMENT IN CARTS.

Specification forming part of Letters Patent No. 52,963, dated March 6, 1866.

*To all whom it may concern:*

Be it known that I, ZE BUTT, of the town of Ocala, in the county of Marion, in the State of Florida, have invented a new and useful Improvement in Dumping-Carts; and I do hereby declare the following is a full, clear, and exact description of the same, reference being had to the accompanying drawings, making part of this specification, in which—

Figure 1 is a side view, showing the configuration and the principal parts of the machine. Fig. 2 is a transverse section, showing the braces and their connection and relation to the body, axle, &c. Fig. 3 shows the adjustable brace. The black lines show where iron is used.

Similar letters refer to the same parts in each figure.

A A are the wheels which support the body, and on the axis of which the body revolves; B B, the body of the cart. It is made deep or high immediately behind the wheels, (see Fig. 1,) for the purpsse of giving a proper, convenient, and useful form to the body, and also for making a support for the horizontal brace C. The body is low in front of the wheels and also back of the wheels, for the convenience of loading, &c.

The tail-board or apron *b* is attached to the body by bolts or pivots at *h*. It is adjustable—that is, can be taken off and put on at pleasure—and by simply changing the holes through which the bolts pass can be placed at any desired angle. It is also self-adjusting, for when the cart is dumped to discharge its load the tail-board or apron revolves on the pivots *h* and opens of its own accord, so as to make room for the load to pass, and when the load is discharged closes by its own gravity.

C is a horizontal brace, which passes over the top of the body and over and beyond the wheels. It is firmly secured to the body, so as to strengthen it and prevent the sides from being pressed outward by the load.

On the outer ends of this brace and outside of the wheels are attached the adjustable braces E E, which pass from thence to the outer ends of the axle to stiffen, strengthen, and support it. (See Fig. 2.) These braces are to be taken off and put on whenever the wheels are removed. These braces are made with a hole in each end, (see Fig. 3,) so as to slip over the ends of the horizontal brace and over the ends of the axle.

F F, the frame, and shafts or tongue, is attached, by a hinge-joint, to the lower part of the body or axle.

*a a a* is the axle, which supports the wheels and passes partly round the body, and to which it is firmly secured, so that they mutually strengthen and support each other, and on this axle the body revolves.

As part of the body of the cart hangs below the point on which it is pivoted, the traction of the team has a tendency to lift or tilt the body, but this is prevented by the self-adjusting catch *d*, which holds the body to its place.

As my improved cart is intended to be drawn by two horses abreast, and as the weight of the tongue and a part of the load in two-wheeled vehicles should be supported by the backs of the horses, and also to prevent too great a dip or inclination of the body of the cart by elevating the tongue too much, I have invented the contrivance shown in Figs. 4 and 5, in which Fig. 5 is a view looking down upon the apparatus, with the tongue of the cart in proper position. In this view the cross-bar or double-tree G and the two single-trees or bows are shown. From the cross-bar or double-tree G there is a projection forward. (Marked J *j j*.) In this projection there is a hole, *k*, in a right line with the bows I I, which receives the bolt which fastens the whole apparatus to the tongue. (See Fig. 4.)

The object of having the bolt or fastening to the tongue in a right line with the bows is to throw the weight of the tongue upon the bows when they are supported by the chains or straps suspended from or over the saddles.

H H are clips pivoted upon the cross-bar G, (see Fig. 4,) and the bows are pivoted upon these clips. (See Fig. 5.) The object of these double joints is to give every requisite motion to the bows. The tongue is also pivoted upon the cross-bar in such a manner as to move freely in any or every required direction.

On the ends of the bows, at *l l*, are clasps or buckles to receive the straps or chains, by which they are suspended from the saddle and under the bodies of the horses. Short braces also pass from the collars to the bows, and the breeching is also buckled into them, so that this invention is intended to answer as a substitute both for the whiffletrees and neck-yoke.

What I claim as my invention, and desire to secure by Letters Patent, is—

1. The manner of constructing, as herein described, and of attaching the tail-board or apron to carts, so as to be self-acting and adjustable.

2. The form or configuration of the cart-body, as described, with the extension B in front and apron behind for the convenience of loading.

3. In connection with the cart-body, as described, the adjustable brace or braces E E, when used for the purposes herein set forth.

4. The apparatus herein described and shown, for sustaining the cart-tongue.

ZE BUTT.

Witnesses:
 J. WM. KREPPS,
 R. C. WEIGHTMAN.